United States Patent
Lee et al.

(10) Patent No.: US 9,674,028 B2
(45) Date of Patent: Jun. 6, 2017

(54) DEVICE AND METHOD OF SIMULTANEOUS DATA TRANSMISSION SERVICE OVER HETEROGENEOUS NETWORKS

(71) Applicant: SK TELECOM CO., LTD., Seoul (KR)

(72) Inventors: Gyu Min Lee, Yongin-si (KR); Jeong Su Kim, Seongnam-si (KR); In Jang Jeong, Seoul (KR); Kyung Hoon Kim, Bucheon-si (KR)

(73) Assignee: SK Telecom Co., Ltd., Seoul (KR)

( * ) Notice: Subject to any disclaimer, the term of this patent is extended or adjusted under 35 U.S.C. 154(b) by 663 days.

(21) Appl. No.: 13/931,022

(22) Filed: Jun. 28, 2013

(65) Prior Publication Data

US 2013/0318257 A1  Nov. 28, 2013

Related U.S. Application Data

(63) Continuation of application No. PCT/KR2012/004336, filed on Jun. 1, 2012.

(30) Foreign Application Priority Data

Jun. 3, 2011 (KR) .................. 10-2011-0054096
Jul. 19, 2011 (KR) .................. 10-2011-0071605

(51) Int. Cl.
*H04L 12/54* (2013.01)
*H04L 29/08* (2006.01)
(Continued)

(52) U.S. Cl.
CPC ...... *H04L 29/0854* (2013.01); *H04L 12/5692* (2013.01); *H04L 67/325* (2013.01);
(Continued)

(58) Field of Classification Search
CPC . H04W 36/00–36/0094; H04W 88/06; H04W 88/14–88/16;
(Continued)

(56) References Cited

U.S. PATENT DOCUMENTS

2006/0291419 A1* 12/2006 McConnell ....... H04L 29/06027
370/331
2007/0058587 A1* 3/2007 Han ...................... H04L 45/24
370/331
(Continued)

FOREIGN PATENT DOCUMENTS

| CN | 101159687 A | 4/2008 |
| CN | 101175325 A | 5/2008 |

(Continued)

OTHER PUBLICATIONS

Kassar at al ,"An Overview of Vertical Handover Decision Strategies in Heterogeneous Wireless Networks" in Computer Communication in Jun. 2008.*

(Continued)

*Primary Examiner* — Wing F Chan
*Assistant Examiner* — Raji Krishnan
(74) *Attorney, Agent, or Firm* — Hauptman Ham, LLP

(57) ABSTRACT

A multi-network based-simultaneous data transmission service is performed by: transmitting, over one or more networks, two or more partial data divided from data to be transmitted in relation to a particular service; when a network switching of the one or more networks is required, identifying a type of the particular service; and performing the network switching at a network switching timing controlled based on the identified type of the particular service.

8 Claims, 6 Drawing Sheets

(51) Int. Cl.
*H04W 36/28* (2009.01)
*H04W 76/02* (2009.01)

(52) U.S. Cl.
CPC .......... *H04L 67/327* (2013.01); *H04W 36/28* (2013.01); *H04W 76/025* (2013.01)

(58) Field of Classification Search
CPC  H04W 48/00–48/20; H04W 28/0268–28/065; H04L 47/10–47/24; H04L 12/2856–12/2867; H04L 29/0027–29/0854; H04L 45/24–45/245
See application file for complete search history.

(56) References Cited

U.S. PATENT DOCUMENTS

| | | | | |
|---|---|---|---|---|
| 2007/0291774 A1* | 12/2007 | Herz | .......... | H04L 29/04 370/401 |
| 2008/0080371 A1* | 4/2008 | Liu | .......... | H04L 12/2856 370/230 |
| 2008/0137568 A1* | 6/2008 | Ho | .......... | H04L 45/245 370/310 |
| 2009/0190524 A1* | 7/2009 | Liu | .......... | H04W 28/24 370/328 |

FOREIGN PATENT DOCUMENTS

| | | |
|---|---|---|
| KR | 1020060093021 | 8/2006 |
| KR | 1020070008572 | 1/2007 |
| KR | 1020070041096 | 4/2007 |
| KR | 1020090032517 | 4/2009 |
| KR | 1020090081639 A | 7/2009 |

OTHER PUBLICATIONS

Google Patent Search results.*
Korean Office Action for application No. 10-2011-0071605 dated Aug. 22, 2013.
3GPP TR 23.893 V8.0.0, Technical Report, 3rd Generation Partnership Project; Technical Specification Group Service and Architecture; Feasibility Study on Multimedia Session Continuity; Stage 2 (Realse 8), Jun. 2008, See sections 5 and 6.6.
Sun Sik Park et al., An Efficient VoD Scheme Providing Service Continuity for Mobile IPTV in Heterogeneous Networks, 2010 10th IEEE International Conference on Computer and Information Technology (CIT 2010), Jul. 1, 2010, 7 pages, Sungkyunkwan University, Suwon, Korea.
Korean Office Action dated Jun. 20, 2012 for Application 10-2011-0054096.
International Search Report mailed Dec. 18, 2012 for PCT/KR2012/004336.

* cited by examiner

DEVICE AND METHOD OF SIMULTANEOUS DATA TRANSMISSION SERVICE OVER HETEROGENEOUS NETWORKS

CROSS-REFERENCE TO RELATED APPLICATION

The present application is a continuation of International Application No. PCT/KR2012/004336 filed on Jun. 1, 2012, which is based on, and claims priorities from, KR Application Serial Number 10-2011-0054096, filed on Jun. 3, 2011 and KR Application Serial Number 10-2011-0071605, filed on Jul. 19, 2011. The disclosures of the above-listed applications are hereby incorporated by reference herein in their entirety.

FIELD

The present disclosure relates to a method and an device for providing a heterogeneous network based-simultaneous data transmission service over two or more networks of in a heterogeneous network environment.

BACKGROUND

The statements in this section merely provide background information related to the present disclosure and may not constitute prior art.

Recently, a service provider simultaneously provides services based on a plurality of wireless technologies in many cases. Main domestic service providers have introduced WCDMA, CDMA, WiBro, and a WLAN (WiFi) technology corresponding to a wireless local area network to construct networks and provide services. Further, currently, a Long Term Evolution (LTE) network is actively introduced.

The inventor(s) have experienced that in a heterogeneous network environment where various networks coexist, a current method in which a terminal device uses a data service through the heterogeneous networks may correspond to a passive method in that the method is an access network selection method by a direct change by a terminal device user which excludes a service provider's controllability when a service provider side is considered.

Meanwhile, at present, as various wireless devices such as a smart phone, a tablet PC and the like increase, a data service charge decreases, and various large-capacity data services increase, a network load rate of the service provider rapidly increases, and thus network investment costs are excessively spent and service stability is threatened.

Accordingly, the inventor(s) have noted that a new service method of actively selecting an access network of the terminal device according to a network status in the heterogeneous network environment where various networks coexist and efficiently transmitting data by using the selected network is required.

SUMMARY

In accordance with some embodiments, a transmission device is configured to provide a simultaneous data transmission service over one or more networks in a heterogeneous network. The transmission device comprises a communication unit and a controller. The communication unit is configured to transmit two or more partial data divided from data to be transmitted in relation to a particular service over the one or more networks. And the controller is configured to perform a network switching of the one or more networks at a network switching timing controlled based on a type of the particular service when the network switching of the one or more networks is required.

In accordance with some embodiments, a reception device is configured to provide a simultaneous data transmission service over one or more networks in a heterogeneous network. The reception device comprises a communication unit and a controller. The communication unit is configured to receive two or more partial data divided from data to be transmitted in relation to a particular service from a transmission device over the one or more networks. Further, the communication unit is configured to receive the two or more partial data from the transmission device according to a network switching of the one or more networks performed at a network switching timing controlled based on a type of the particular service when the network switching of the one or more networks is required. The controller is configured to reconstruct the data to be transmitted by combining the two or more partial data received over the one or more networks.

In accordance with some embodiments, the transmission device performs a simultaneous data transmission service over one or more networks in a heterogeneous network. The transmission device is configured to transmit, two or more partial data divided from data to be transmitted in relation to a particular service over the one or more networks; determine a type of the particular service when a network switching of the one or more networks is required; and perform, the network switching at a network switching timing controlled based on the determined type of the particular service.

BRIEF DESCRIPTION OF THE DRAWINGS

The above and other objects, features and advantages of various embodiments of the present disclosure will be more apparent from the following detailed description taken in conjunction with the accompanying drawings, in which.

DETAILED DESCRIPTION

Hereinafter, at least one embodiment of the present disclosure will be described with reference to the accompanying drawings.

Figure 1:
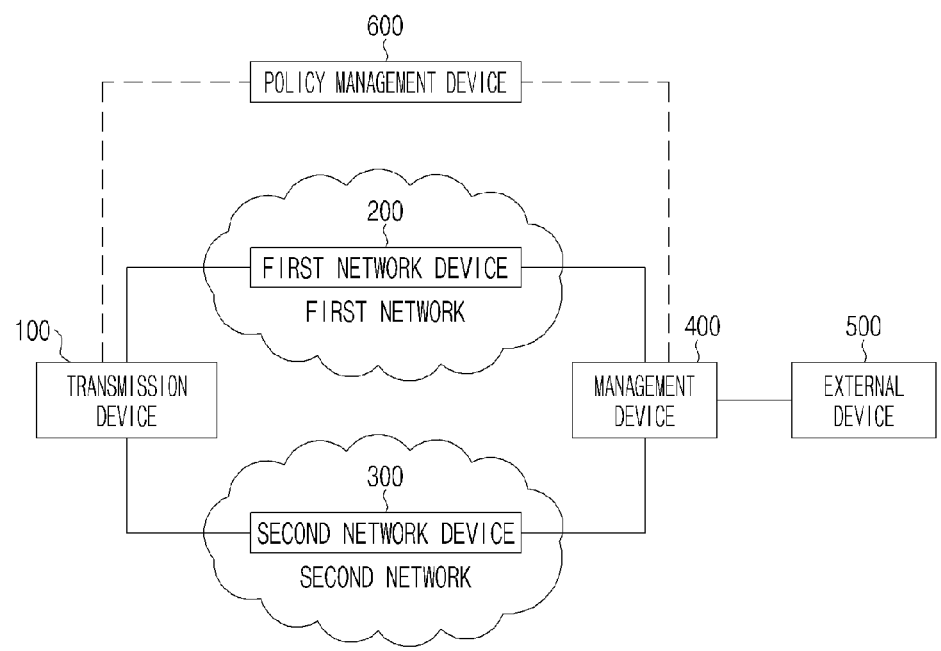
FIG. 1 is a schematic block diagram of a heterogeneous network-based simultaneous data transmission service system according to at least one embodiment of the present disclosure.

FIG. 1 is a configuration diagram schematically illustrating a heterogeneous network based-simultaneous data transmission service system according to at least one embodiment of the present disclosure.

Referring to FIG. 1, a heterogeneous network based-simultaneous data transmission service system according to at least one embodiment of the present disclosure includes: a terminal device 100 as a transmission device configured to divide data into two or more partial data, insert particular virtual network access information in first partial data corresponding to a part of the two or more partial data and then transmit the first partial data, and insert the virtual network access information in second partial data corresponding to another part of the two or more partial data and then transmit the second partial data; a first network device 200 configured to receive the first partial data from the terminal device 100; a second network device 300 configured to receive the second partial data from the terminal device 100; and a management device 400 as a reception device, configured to respectively receive the first partial data from the first network device 200, receive the second partial data from the second network device 300, and then combine the received first partial data and the received second partial data according to the particular network access information based on the network access information included into the received first partial data and second partial data, so as to reconstruct (or reconstitute, or generate) the data. In some embodiments, e.g., in uplink process shown as FIG. 3, the terminal device 100 is configured to function as a transmission device and the management device 400 is configured to function as reception device. In further embodiments, e.g., in a downlink process shown as FIG. 4, the terminal device 100 is configured to function as a reception device and the management device 400 is configured to function as transmission device. Further, the heterogeneous network-based simultaneous data transmission service system according to the present disclosure includes an external device 500 configured to receive combined data (i.e., reconstructed data) from the management device 400 and a policy management device 600 configured to provide a network selection policy.

A heterogeneous network-based simultaneous data transmission service according to the present disclosure implements a configuration of dividing data, which is to be transmitted/received between the terminal device 100 and the external device 500, and transmitting/receiving the data by using a plurality of heterogeneous networks.

Accordingly, in the present disclosure, the management device 400 performs a session division to implement simultaneous link transmission through a plurality of heterogeneous networks for one session. At this time, since the terminal device 100 is connected to each of the plurality of heterogeneous networks, the management device 400 recognizes that each of the simultaneous links through the plurality of heterogeneous networks corresponds to a link of one terminal device 100, and manages the one terminal device 100 as one subject. To this end, it is necessarily required to allocate and manage separate network access information (for example, a virtual IP) for the simultaneous transmission service in accordance with the terminal device 100.

The external device 500 refers to a server device configured to perform data transmission/reception with the terminal device 100 through the management device 400, and can provide various services such as a portal service, a content providing service and the like to the terminal device 100 through the data transmission/reception by the management device 400.

Further, the policy management device 600 determines a network selection policy including a data transmission rate of each network set based on various network parameters on the heterogeneous networks including, for example, a subscriber preference, a subscriber type, a subscription payment system, an application type to be serviced and the like, and network status information according to a network status change received from the terminal device 100 and the management device 400, and provides the determined network selection policy to the terminal device 100 and the management device 400.

Meanwhile, the heterogeneous networks may correspond to various access networks including, for example, WCDMA, CDMA, WiBro, WLAN (WiFi), and Long Term Evolution (LTE), but in at least one embodiment the heterogeneous networks will be exemplarily described, but not limited thereto, to include a first network (hereinafter, referred to as a "3G network) which refers to a wireless packet service network (WCDMA) and a second network (hereinafter, referred to as a "WiFi network) which refers to a wireless local area network.

Accordingly, the first network device 200 refers to Gateway GPRS Support Node (GGSN) equipment for operating the 3G network, that is, the wireless packet service network, and the second network device 300 refers to an Access Point (AP) for operating the WiFi network, that is, the wireless local area network.

Further, the terminal device 100 and the management device 400 may be either a transmission/reception device or a reception device in viewpoint of a service flow, that is, according to a subject which transmits data by using the simultaneous data transmission service, that is, according to an uplink process and a downlink process. In at least one embodiment, for convenience of the description, the description will be made by presuming that the terminal device 100 is located and transmits and receives data in a heterogeneous network environment and the management device 400 provides the simultaneous data transmission service to the terminal device 100.

The terminal device 100 is configured to select partial data which is divided from data to be transmitted based on a network selection policy, in which a data transmission rate of each network received from the policy management device 600 is set, in order to use a simultaneous data transmission service.

That is, the terminal device 100 divides the data to be transmitted into pieces of partial data, the number of which corresponds to the number of networks, for the simultaneous data transmission using the heterogeneous network environment, that is, the 3G network and the WiFi network, and the division process may be performed according to the network selection policy transmitted from the policy management device 600.

In other words, the terminal device 100 identifies a first transmission rate for data transmission to the first network device 200 and a second transmission rate for data transmission to the second network device 300 included in the network selection policy, selects first partial data to be transmitted to the first network device 200 from the divided partial data, and selects second partial data to be transmitted to the second network device 300 from the remaining partial data based on the identified transmission rates.

Accordingly, by performing the data division process based on the traffic distribution rate of each network corresponding to the network selection policy, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Then, the terminal device 100 transmits the divided partial data through the first network device 200 and the second network device 300 based on the network selection policy.

That is, the terminal device 100 transmits the first partial data to the first network device 200 located on the 3G network, and the first network device 200 then transmits the first partial data to the management device 400 functioning as a reception device. Further, the terminal device 100 transmits the second partial data to the particular second network device 300 selected based on information of a network device to be accessed, and the second network device 300 then transmits the second partial data to the management device 400 functioning as a reception device.

Meanwhile, when network switching is required in a process of using a simultaneous data transmission service through the first network device 200 and the second network device 300 according to the network selection policy, the terminal device 100 determines whether the simultaneous data transmission service requires continuity, by identifying the type of a currently executed (or provided) service.

That is, the terminal device 100 is configured to determine whether the simultaneous data transmission service requires continuity, by identifying the type of a currently executed service according to change in the data transmission rate of each network according to the network selection policy or network switching based on network information collected at a current location, i.e. in response to new recognition of a second network device 300 for operating a WiFi network (i.e. a wireless local area network) through a scan operation, for example, according to change in the data transmission rate between the 3G network and the WiFi network or a new WiFi network access.

To this end, the terminal device 100 stores the service type information designated corresponding to identification information of an application providing the particular service and identifies the identification information of the application corresponding to a particular service (for example, all the service related to data transmission/reception such as a download service and a streaming service, and e.g., VoIP, VOD, Web, FTP, or the like) a currently executed service, based on this so that the terminal device 100 identifies a service type corresponding to the currently executed service, and determines whether the currently executed service requires continuity, in accordance with the identified service type.

In other words, the terminal device 100 identifies a type of the currently executed service, e.g., VoIP, VOD, Web, FTP, or the like based on the identified identification information of an application providing a particular service. When the identified service type is a service which requires a download service or a streaming service, the terminal device 100 determines the corresponding service as a service requiring continuity.

In at least another embodiment, the terminal device 100 receives identification information of the particular application from a particular device interworked with a particular application, e.g., the external device 500 and identifies the service type based on the corresponding identification information to thereby determine whether the currently executed service requires continuity.

Moreover, the terminal device 100 is configured to perform the network switching by controlling network switching timing as a result of the determination.

That is, when the currently executed service (i.e., the currently used service) is determined as a service requiring continuity, the terminal device 100 performs the network switching at least in a case in which a termination state of the currently executed service is identified by controlling the network switching timing so that continuity of the service can be guaranteed by preventing the service from being forcefully terminated according to the network switching. That is, in the case of determining the currently executed service as a service requiring continuity, the network switching is performed by the terminal device 100 after the currently executed service is completed, without forcefully terminating the service. Meanwhile, when the currently executed service is determined as a service not requiring continuity, the terminal device 100 can immediately perform the network switching without waiting for the currently executed service to be completed.

The management device 400 receives the first partial data from the first network device 200 and the second partial data from the second network device 300 and generates data by combining the received first partial data and the received second partial data based on the virtual network access information included in the received first partial data and second partial data, so as to reconstruct (or reconstitute) the data to be transmitted, which the terminal device 100 desires to transmit.

That is, the management device 400 can generate the original data to be transmitted by recognizing the first partial data and the second partial data having the same virtual network access information based on the virtual network access information included in the received several partial data and combining or coupling the first partial data and the second partial data according to order information included in the corresponding partial data.

Further, the management device 400 transmits the reconstructed data to be transmitted to the external device 500 by using access information of the external device corresponding to a final destination recognized through at least one piece of partial data among the first partial data and the second partial data.

As described above, the first partial data and the second partial data divided by the terminal device 100 are combined by the management device 400 during the process in which the first partial data and the second partial data pass through the management device 400 through the heterogeneous networks, so that they are reconstructed into the original data to be transmitted. Then, the reconstructed data to be transmitted is transferred to the external device 500 which is the final destination.

Figure 2:
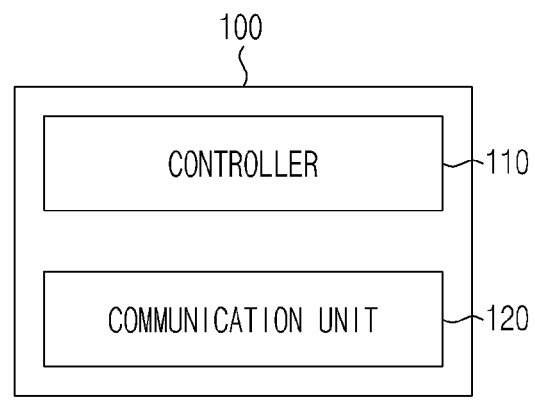
FIG. 2 is a schematic block diagram of a terminal device according to at least one embodiment of the present disclosure.

Hereinafter, the terminal device 100 according to at least one embodiment of the present disclosure will be described in more detail with reference to FIG. 2.

That is, the terminal device 100 includes: a controller 110 configured to divide data into partial data according to a network selection policy and, when network switching is required, perform the network switching by identifying a type of a currently executed service; and a communication unit 120 is controlled by the controller 100 to transmit the divided partial data through the heterogeneous networks. Herein, the controller 110 is usually incorporated on an operating system (OS) kernel mounted on the terminal device 100 and performs a series of operations for the simultaneous data transmission service according to a request of a particular application which is embedded or downloaded in the terminal device 100. Further, the communication unit 120 refers to a communication module for interworking with the first network device 200 by using the 3G network and interworking with the second network device 300 by using the WiFi network.

The controller 110 is configured to select partial data divided from the data to be transmitted based on the network selection policy, in which a data transmission rate of each network received from the policy management device 600 is set, in order to use a simultaneous data transmission service.

That is, the controller 110 divides data to be transmitted into pieces of data, the number of which corresponds to the number of networks, in order to simultaneously transmit data by using the heterogeneous network environment, i.e., a 3G network and a WiFi network.

In this event, according to a scheme in which controller 110 determines whether to use the simultaneous data transmission service, the controller 110 either may directly determine whether to use the simultaneous data transmission service, based on a current location of the terminal device 100 and whether the terminal device 100 has subscribed to the simultaneous data transmission service, or the like, or may receive a result of determination on whether the terminal device 100 uses the simultaneous data transmission service, from a device (for example, the policy management device 600 or the management device 400) located in a currently executed (or used, or accessed) network.

Therefore, when the controller 110 has directly determined whether to use the simultaneous data transmission service or has received a result of a determination to use the simultaneous data transmission service from the outside, the controller 110 divides the data to be transmitted, into pieces of data, the number of which corresponds to the number of networks, for the simultaneous data transmission over at least one of the heterogeneous networks according to the determination, which include the 3G network and the WiFi network, and the division process may be performed according to the network selection policy transmitted from the policy management device 600.

In other words, the controller 110 identifies a first transmission rate for data transmission to the first network device 200 and a second transmission rate for data transmission to the second network device 300 included in the network selection policy, selects, from the divided partial data, first partial data to be transmitted to the first network device 200, and selects second partial data to be transmitted to the second network device 300 from remaining partial data of the divided partial data based on the identified transmission rates.

Accordingly, by performing the data division process based on the traffic distribution rate of each network corresponding to the network selection policy, the controller 110 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

The communication unit 120 is controlled by the controller 110 to thereby transmit divided partial data through the first network device 200 and the second network device 300 based on the network selection policy.

That is, the communication unit 120, controlled by the controller 110, transmits the first partial data to the first network device 200 located on the 3G network, and the first network device 200 then transmits the first partial data to the management device 400 functioning as a reception device. Further, the communication unit 120 transmits the second partial data to the particular second network device 300 selected based on information of a network device to be accessed, and the second network device 300 then transmits the second partial data, received from the communication unit 120, to the management device 400 functioning as a reception device.

Meanwhile, when network switching is required in a process of using a simultaneous data transmission service through the first network device 200 and the second network device 300 according to the network selection policy, the controller 110 determines whether a currently executed (or used, or accessed) service requires continuity, by identifying the type of a currently executed service.

Herein, a case in which the network switching is required may include a case in which a transmission rate of partial data for a network is changed and a case in which a network for transmitting partial data other than the currently executed network is added.

For example, changing a data transmission rate for a network according to the network selection policy or network switching based on network information collected at a current location, i.e. in response to new recognition of a second network device 300 for operating a WiFi network (i.e. a wireless local area network) through a scan operation, for example, changing a data transmission rate between the 3G network and the WiFi network or a new WiFi network (i.e., another added WiFi network) access corresponds to a case in which the network switching is required.

In this event, the controller 110 either may directly determine whether the network switching as described above is required or may receive a determination on whether the terminal device 100 requires the network switching from a device (for example, the policy management device 600 or the management device 400) located in the currently executed network.

Therefore, when the controller 110 has determined that the network switching is required, the controller 110 determines whether a service requires continuity, by identifying the type of the currently executed service.

To this end, the controller 110 stores the service type information designated corresponding to identification information of an application providing a particular service and identifies the identification information of the application corresponding to a currently executed service based on this so that the terminal device 100 identifies a service type corresponding to the currently executed service, and determines whether the service requires continuity, in accordance with the identified service type.

In other words, the controller 110 identifies the type of the currently executed service, e.g., VoIP, VOD, Web, FTP, or the like based on the identified identification information of an application and, when the identified service type is a service which requires a download service or a streaming service, determines the corresponding service as a service requiring continuity.

In at least another embodiment, the controller 110 receives identification information of the particular application from a particular device interworked with a particular application, e.g., the external device 500 and identifies the service type based on the corresponding identification information to thereby determine whether the currently executed service requires continuity.

Moreover, the controller 110 is configured to perform the network switching by controlling network switching timing as a result of the determination.

That is, when the currently executed service is determined as a service requiring continuity, the controller 110 causes the currently executed service to be continued through the communication unit 120 by performing the network switching at least in a case in which a termination state of the currently executed service is identified and controlling the network switching timing so that continuity of the service can be guaranteed by preventing the service from being forcefully terminated according to the network switching. That is, in the case of determining the currently executed service as a service requiring continuity, the network switching is controlled by the controller to be performed after the currently executed service is completed without forcefully terminating the current executed service. Meanwhile, when the currently executed service is determined as a service not requiring continuity, the controller 110 immediately performs the network switching without waiting for the currently executed service to be completed.

As described above, in a case of simultaneously transmitting data by dividing the data to be transmitted in accordance with the network selection policy in the heterogeneous network environment, when the network switching is required, a heterogeneous network based-simultaneous data transmission service system determines whether the currently executed service requires continuity, by identifying the type of the currently executed service and performs the network switching by controlling the network switching timing as a result of the determination. As a result, the heterogeneous network based-simultaneous data transmission service system may implement an efficient and highly reliable heterogeneous network based-simultaneous data transmission service and guarantee continuity of the service by efficiently controlling access to the network device depending on a service type of whether the currently executed service requires a continuity or not.

Figure 6:
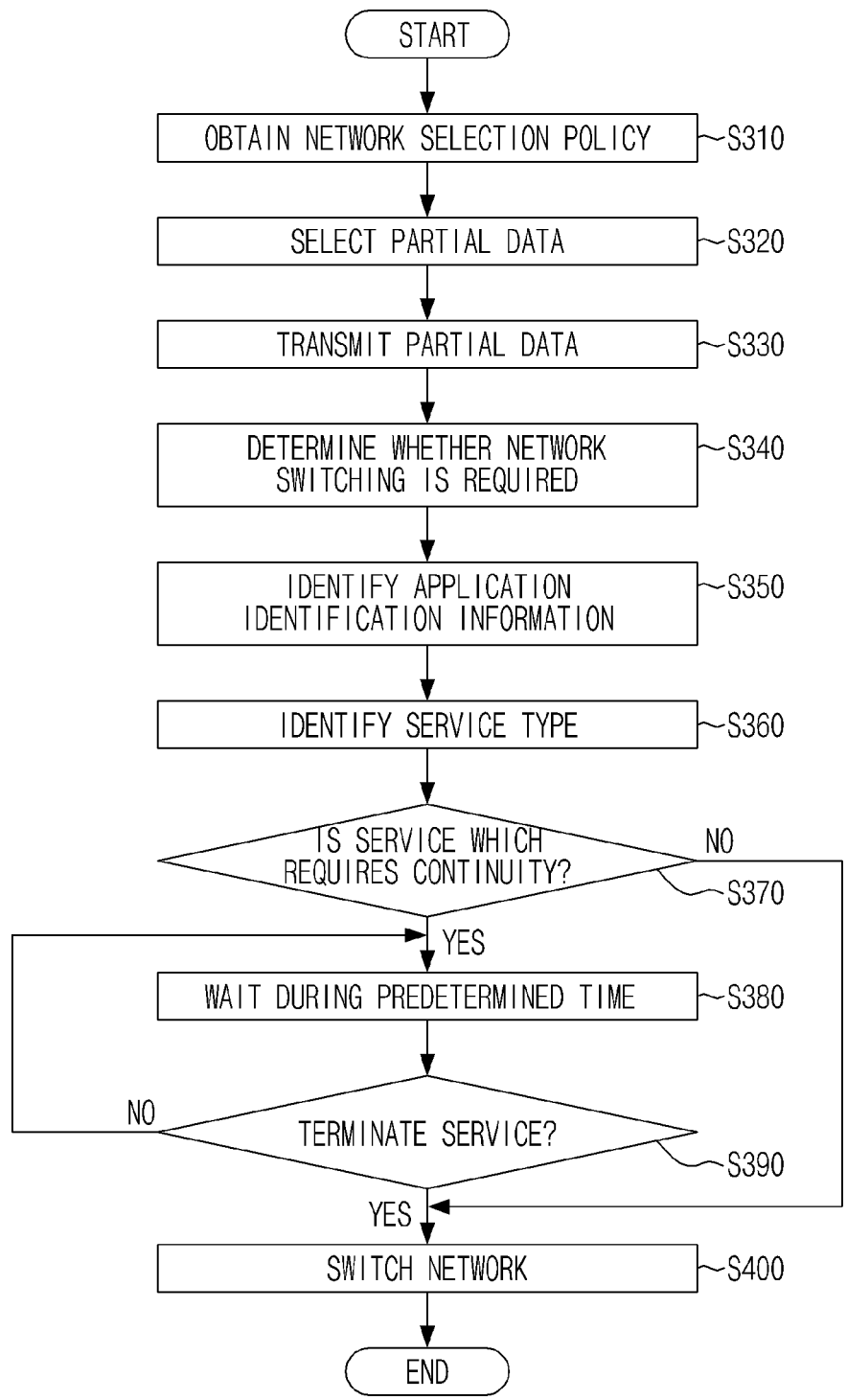
FIG. 6 is a flowchart of an operation of a terminal device according to at least one embodiment of the present disclosure.

Hereinafter, a heterogeneous network based-simultaneous data transmission service method according to at least one embodiment of the present disclosure will be described with reference to FIG. 3 and FIG. 6. Herein, for convenience of the description, the same reference numerals as those used in FIG. 1 and FIG. 2 will be used.

Above all, an uplink process in the heterogeneous network based-simultaneous data transmission service according to at least one embodiment of the present disclosure will be described with reference to FIG. 3.

First, the policy management device 600 generates the network selection policy including a set data transmission rate of each network and provides the generated network selection policy to the terminal device 100 in steps S110 and S120.

The policy management device 600 determines a network selection policy including a data transmission rate of at least one network set based on various network parameters on the heterogeneous networks including, for example, a subscriber preference, a subscriber type, a subscription payment system, an application type to be serviced and the like, and network status information according to a network status change received from the terminal device 100 and the management device 400, and provides the determined network selection policy to the terminal device 100 and the management device 400.

Then, after dividing data into partial data, the terminal device 100 selects partial data divided from the data to be transmitted based on the network selection policy to which the data transmission rate for a network received from the policy management device 600 is set in step S130.

The terminal device 100 divides the data to be transmitted into pieces of data, the number of which corresponds to the number of networks, for the simultaneous data transmission using the heterogeneous network environment, that is, the 3G network and the WiFi network, and the division process may be performed according to the network selection policy transmitted from the policy management device 600.

In other words, the terminal device 100 identifies a first transmission rate for data transmission to the first network device 200 and a second transmission rate for data transmission to the second network device 300 included in the network selection policy, selects first partial data to be transmitted to the first network device 200 from divided partial data, and selects second partial data to be transmitted to the second network device 300 from the remaining partial data of the divided partial data based on the identified transmission rates.

Accordingly, by performing the data division process based on the traffic distribution rate of each network corresponding to the network selection policy, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Then, the terminal device 100 transmits the selected divided partial data through the first network device 200 and the second network device 300 based on the network selection policy in step S140.

That is, the terminal device 100 transmits the first partial data to the first network device 200 located on the 3G network, and the first network device 200 then transmits the first partial data to the management device 400 functioning as a reception device. Further, the terminal device 100 transmits the second partial data to the particular second network device 300 selected based on information of a network device to be accessed, and the second network device 300 then transmits the second partial data to the management device 400 functioning as a reception device.

The management device 400 receives the first partial data from the first network device 200 and the second partial data from the second network device 300, and reconstructs (or reconstitutes or generates) data by combining the received first partial data and the received second partial data based on the virtual network access information included in the received first partial data and second partial data, which the terminal device 100 desires to transmit in steps S150 and S160.

That is, the management device 400 can reconstruct (or generate) the original data transmitted from the terminal device by recognizing the first partial data and the second partial data having the same virtual network access information based on the virtual network access information included in the received several partial data and combining or coupling the first partial data and the second partial data according to order information included in the corresponding partial data.

Further, the management device 400 transmits the reconstructed data to the external device 500 by using access information of the external device corresponding to a final destination recognized through at least one piece of partial data among the first partial data and the second partial data.

As described above, the first partial data and the second partial data divided by the terminal device 100 are combined by the management device 400 during the process in which the first partial data and the second partial data are transmitted to the management device 400 through the heterogeneous networks and reconstructed into the original data to be transmitted. Then, the reconstructed data is transferred to the external device 500 which is the final destination.

Meanwhile, when network switching is required in a process of using a simultaneous service through the first network device 200 and the second network device 300 according to the network selection policy, the terminal device 100 determines whether a currently executed service requires continuity by identifying the type of a currently executed service in steps S170 to S190.

That is, the terminal device 100 determines whether the currently executed service requires continuity by identifying the type of the currently executed service according to change in the data transmission rate of each network according to the network selection policy or network switching according to network information collected in a current location, i.e., recognition of a new second network device (i.e., another added second network device) 300 for operating the WiFi network, i.e., the near-field wireless network through a scan operation, for example, according to change in the data transmission rate between the 3G network and the WiFi network or a new WiFi network access.

To this end, the terminal device 100 stores the service type information designated corresponding to identification information of an application and identifies the identification information of the application corresponding to a currently executed service based on this so that the terminal device 100 identifies a service type corresponding to the currently executed service, and determines whether the currently executed service requires continuity, in accordance with the identified service type.

In other words, the terminal device 100 identifies the type of the currently executed service, e.g., VoIP, VOD, Web, FTP, or the like based on the identified identification information of the application. When the identified service type is a service which requires a download service or a streaming service, the terminal device 100 determines the corresponding currently executed service as a service requiring continuity.

In at least another embodiment, the terminal device 100 receives identification information of the particular application from a particular device interworked with a particular application, e.g., the external device 500 and identifies the service type based on the corresponding identification information to thereby determine whether the currently executed service requires continuity.

Then, the terminal device 100 performs the network switching by controlling network switching timing as a result of the determination in steps S200 and S210 as follows.

Namely, when the currently executed service is determined as a service requiring continuity, the terminal device 100 performs the network switching at least in a case in which a termination state of the currently executed service is identified by controlling the network switching timing so that continuity of the service can be guaranteed by preventing the currently executed service from being forcefully terminated according to the network switching. That is, in the case of determining the currently executed service as a service requiring continuity, the network switching is controlled by the controller to be performed after the currently executed service is completed without forcefully terminating the current executed service. Meanwhile, when the currently executed service is determined as a service not requiring continuity, the terminal device 100 immediately performs the network switching, without waiting for the currently executed service to be completed.

Figure 4:
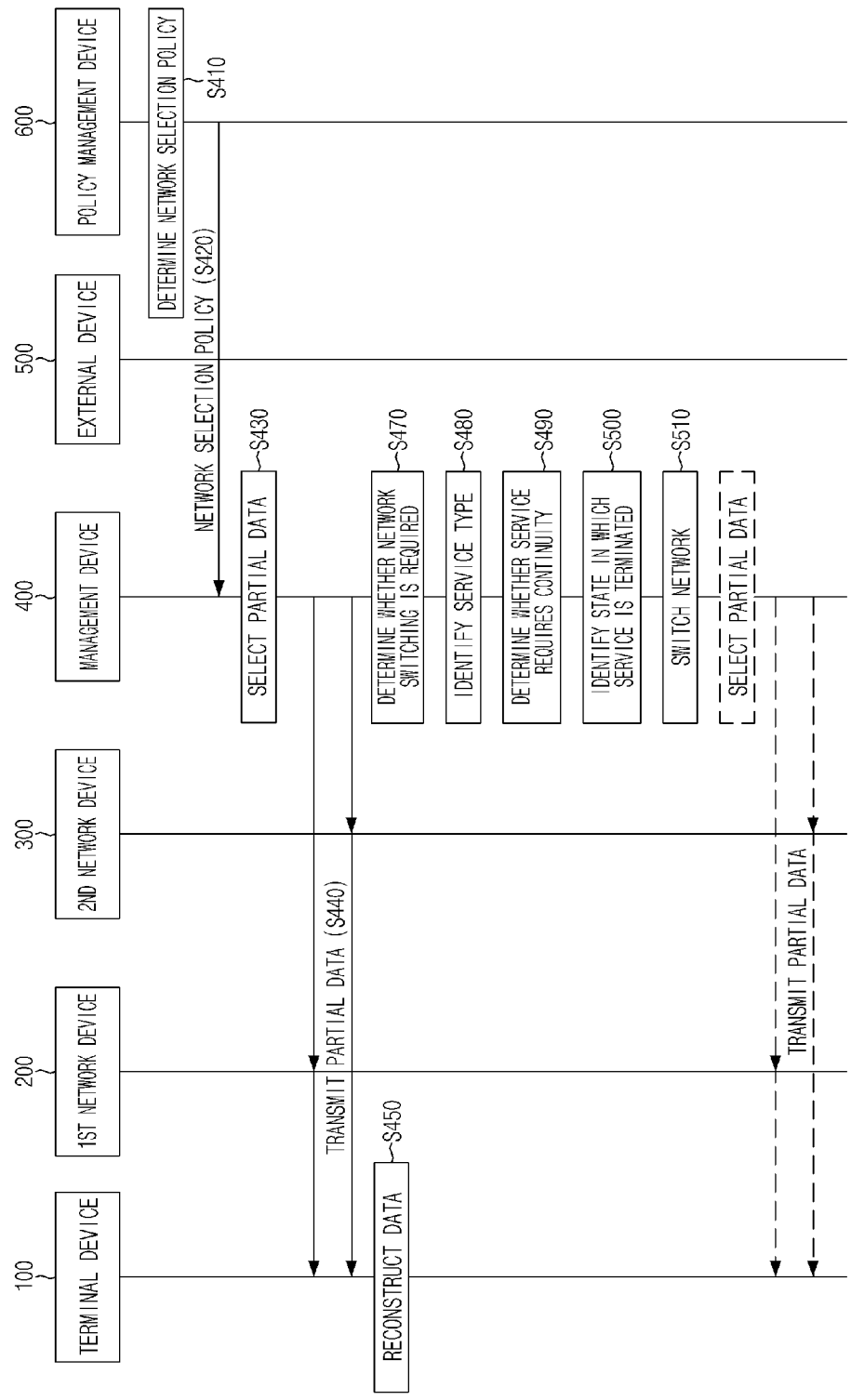
FIG. 4 is a flowchart of a downlink process in an operation method of a heterogeneous network based-simultaneous data transmission service system according to at least one embodiment of the present disclosure.

A downlink process in a heterogeneous network based-simultaneous data transmission service system according to at least one embodiment of the present disclosure will be described with reference to FIG. 4.

First, the policy management device 600 generates the network selection policy including a set data transmission rate of each network of two or more networks in heterogeneous networks and provides the network selection policy to the terminal device 100 in steps S410 and S420.

The policy management device 600 determines a network selection policy including a data transmission rate of each network set based on various network parameters on the heterogeneous networks including, for example, a subscriber preference, a subscriber type, a subscription payment system, an application type to be serviced and the like, and network status information according to a network status change received from the terminal device 100 and the management device 400, and provides the determined network selection policy to the terminal device 100 and the management device 400.

Then, after dividing data into partial data, the management device 400 selects partial data divided from the data to be transmitted based on the network selection policy in which the data transmission rate for a network received from the policy management device 600 is set, in step S430.

The management device 400 divides the data to be transmitted to the terminal 100 into pieces of data, the number of which corresponds to the number of networks, for the simultaneous data transmission using the heterogeneous network environment, that is, the 3G network and the WiFi network, and the division process may be performed according to the network selection policy transmitted from the policy management device 600.

In other words, the management device 400 identifies a first transmission rate for data transmission to the first network device 200 and a second transmission rate for data transmission to the second network device 300 included in the network selection policy, selects first partial data to be transmitted to the first network device 200 from divided partial data, and selects second partial data to be transmitted to the second network device 300 from the remaining partial data of the divided partial data based on the identified transmission rates.

Accordingly, by performing the data division process based on the traffic distribution rate of each network corresponding to the network selection policy, the management device 400 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Then, the management device 400 respectively transmits divided partial data through the first network device 200 and the second network device 300 based on the network selection policy in step S440.

That is, the management device 400 transmits the first partial data to the first network device 200 located on the 3G network, and the first network device 200 then transmits the first partial data to the terminal device 100 functioning as a reception device. Further, the management device 400 transmits the second partial data to the particular second network device 300 selected based on information of a network device to be accessed, and the second network device 300 then transmits the second partial data to the terminal device 100 as a reception device.

Then, the terminal device 100 receives the first partial data from the first network device 200 and the second partial data from the second network device 300 and reconstructs (or reconstitutes or generates) original data, which are desired to be transmitted by the management device 400, by combining the received first partial data and the received second partial data based on the virtual network access information included in the received first partial data and second partial data in step S450.

That is, the terminal device 100 can reconstruct the original data to be transmitted by recognizing the first partial data and the second partial data having the same virtual network access information based on the virtual network access information included in the received several partial data and combining or coupling the first partial data and the second partial data according to order information included in the corresponding partial data.

Meanwhile, when network switching is required in a process of using a simultaneous service through the first network device 200 and the second network device 300 according to the network selection policy, the management device 400 determines whether a currently executed service requires continuity by identifying the type of a currently executed service in steps S470 to S490.

The management device 400 determines whether the currently executed service requires continuity by identifying the type of a currently executed service according to change in the data transmission rate of each network according to the network selection policy or network switching according to network information collected in a current location of the terminal device 100, i.e., recognition of a new second network device (i.e., another added second network device) 300 for operating the WiFi network, i.e., the near-field wireless network through a scan operation, for example, according to change in the data transmission rate between the 3G network and the WiFi network or a new WiFi network access (i.e., another WiFi network access added in heterogeneous networks).

To this end, the management device 400 stores the service type information designated corresponding to identification information of an application and identifies the identification information of the application corresponding to a currently executed service based on this so that the terminal device 100 identifies a service type corresponding to a currently executed service, and determines whether a service requires continuity, in accordance with the identified service type.

In other words, the management device 400 identifies the type of the currently executed service, e.g., VoIP, VOD, Web, FTP, or the like based on the identification information of the application identified by the terminal device 100 and, when the identified service type is a service which requires a download service or a streaming service, determines the corresponding service as a service requiring continuity.

In at least another embodiment, the management device 400 receives identification information of the particular application from a particular device interworked with a particular application corresponding to the terminal 100, e.g., the external device 500 and identifies the service type based on the corresponding identification information to thereby determine whether the currently executed service requires continuity.

Then, the management device 400 performs the network switching by controlling network switching timing as a result of the determination in steps S500 and S510 as follows.

Namely, when the currently executed service is determined as a service requiring continuity, the management device 400 performs the network switching at least in a case in which a termination state of the currently executed service is identified by controlling the network switching timing so that continuity of the service can be guaranteed by preventing the service from being forcefully terminated according to the network switching. Meanwhile, when the currently executed service is determined as a service not requiring continuity, the management device 400 immediately performs the network switching.

Figure 5:
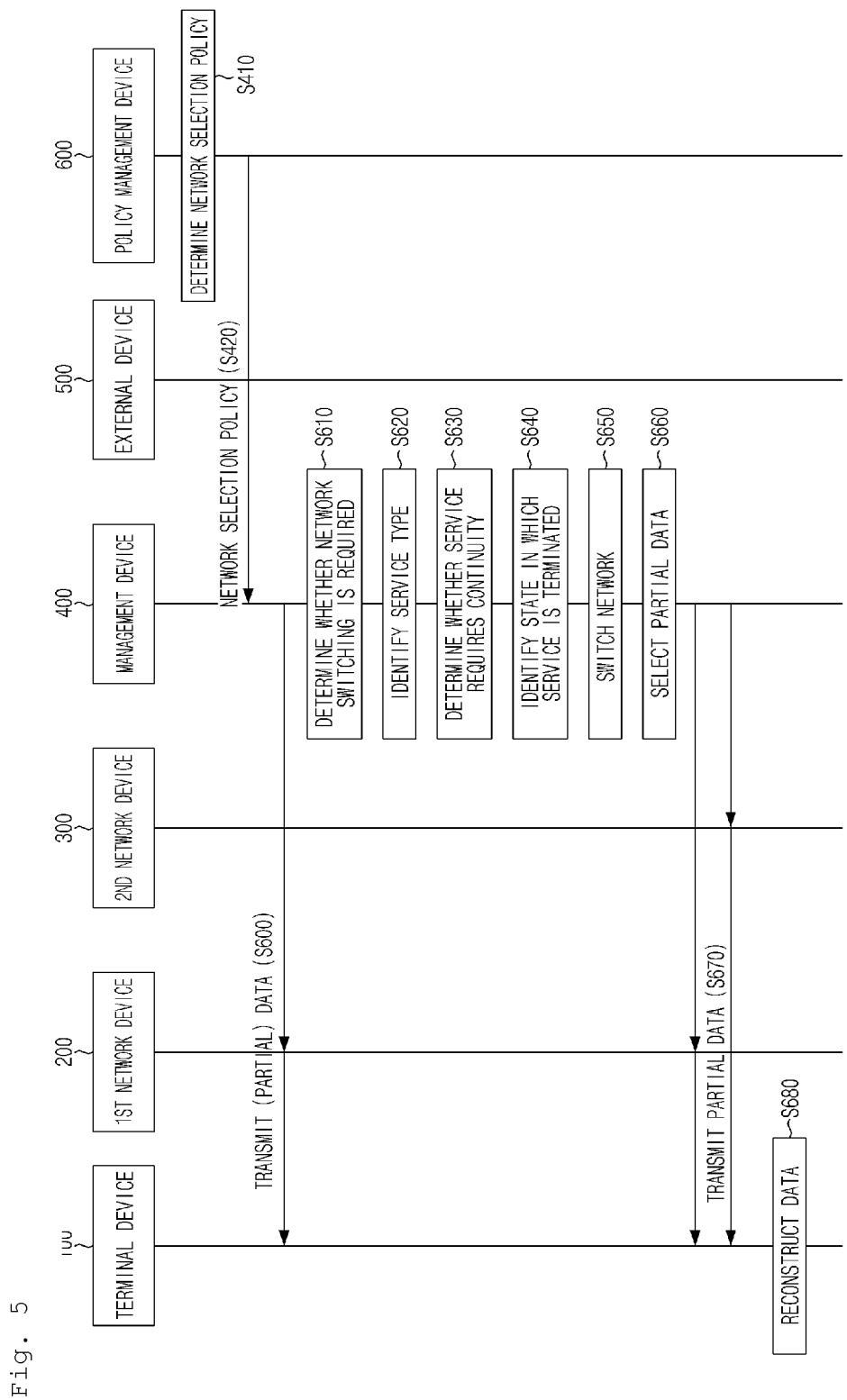
FIG. 5 is a flowchart of a downlink process in an operation method of a heterogeneous network based-simultaneous data transmission service system according to at least one embodiment of the present disclosure.

Another situation (a case of offloading to which a network is added) of the downlink process in a heterogeneous network based-simultaneous data transmission service system according to at least one embodiment of the present disclosure will be described with reference to FIG. 5. For description convenience, it is assumed that the second network device 300 in FIG. 5 is additionally used to transmit data in heterogeneous networks. In at least another embodiment, another second network device can be additionally used to transmit data in a case where the first and second network devices are currently used to transmit data in heterogeneous networks.

First, the policy management device 600 generates the network selection policy including a set data transmission rate of each network and provides the network selection policy to the terminal device 100 in steps S410 and S420.

The policy management device 600 determines a network selection policy including a data transmission rate of each network set based on various network parameters on the heterogeneous networks including, for example, a subscriber preference, a subscriber type, a subscription payment system, an application type to be serviced and the like, and network status information according to a network status change received from the terminal device 100 and the management device 400, and provides the determined network selection policy to the terminal device 100 and the management device 400.

The management device 400 may transmit data to be transmitted to the terminal device 100 through the first network, i.e., the 3G network in step S600. In this event, the management device 400 may divide the data to be transmitted to the terminal device 100 into partial data for a packet unit and transmit the divided partial data to the terminal device 100 through the 3G network.

Therefore, the terminal 100 may receive the data to be transmitted through the first network, i.e., the 3G network and reconstruct the data to be transmitted by receiving partial data divided in the data to be transmitted and then combining those data.

Meanwhile, when network switching, e.g., a second network 300 (for example: WiFi) is required to be added in a process of transmitting data by using the first network device 200 according to the network selection policy, the management device 400 determines whether a currently executed service requires continuity, by identifying the type of the currently executed service in steps S610 to S630.

The management device 400 determines whether the currently executed service requires continuity by identifying the type of a currently executed service according to change in the data transmission rate of each network according to the network selection policy or network switching according to network information collected in a current location of the terminal device 100, i.e., recognition of the added second network device 300 for operating the WiFi network, i.e., the near-field wireless network through a scan operation, for example, according to change in the data transmission rate between the 3G network and the WiFi network or added WiFi network access.

To this end, the management device 400 stores the service type information designated corresponding to identification information of an application and identifies the identification information of the application corresponding to a currently executed service based on this so that the terminal device 100 identifies a service type corresponding to the currently executed service, and determines whether the currently executed service requires continuity, in accordance with the identified service type of the currently executed service.

In other words, the management device 400 identifies a type of the currently executed service, e.g., VoIP, VOD, Web, FTP, or the like based on the identification information of the application identified by the terminal device 100 and, when the identified service type is a service which requires a download service or a streaming service, determines the corresponding service as a service requiring continuity.

In at least another embodiment, the management device 400 receives identification information of the particular application from a particular device interworked with a particular application corresponding to the terminal 100, e.g., the external device 500 and identifies the service type based on the corresponding identification information to thereby determine whether the currently executed service requires continuity.

Then, the management device 400 performs the network switching by controlling network switching timing as a result of the determination in steps S640 and S650.

When the currently executed service is determined as a service requiring continuity, the management device 400 performs adding the second network at least in a case in which a termination state of the currently executed service is identified by controlling the second network adding time so that continuity of the service can be guaranteed by preventing the service from being forcefully terminated according to the network switching. Meanwhile, when the currently executed service is determined as a service not requiring continuity, the management device 400 immediately performs adding the second network.

Then, according to the network switching, i.e., the process of adding the second network, the management device 400 divides the data to be transmitted to the terminal 100 into pieces of data, the number of which corresponds to the number of networks, for the simultaneous data transmission using the heterogeneous network environment, that is, the 3G network and the WiFi network in step S660, and the division process may be performed according to the network selection policy transmitted from the policy management device 600.

Then, the management device 400 transmits divided partial data through the first network device 200 and the added second network device 300 based on the network selection policy in step S670.

That is, the management device 400 transmits the first partial data to the first network device 200 located on the 3G network, and the first network device 200 then transmits the first partial data to the terminal device 100 functioning as a reception device. Further, the management device 400 transmits the second partial data to the particular second network device 300 selected based on information of a network device to be accessed, and the second network device 300 then transmits the second partial data to the terminal device 100 as a reception device.

Then, the terminal device 100 receives the first partial data from the first network device 200 and the second partial data from the added second network device 300 and reconstructs data, which the management device 400 desires to transmit, by combining the received first partial data and the received second partial data based on the virtual network access information included in the received first partial data and second partial data in step S680.

That is, the terminal device 100 can reconstruct the original data to be transmitted by recognizing the first partial data and the second partial data having the same virtual network access information based on the virtual network access information included in the received several partial data and combining or coupling the first partial data and the second partial data according to order information included in the corresponding partial data.

Figure 3:
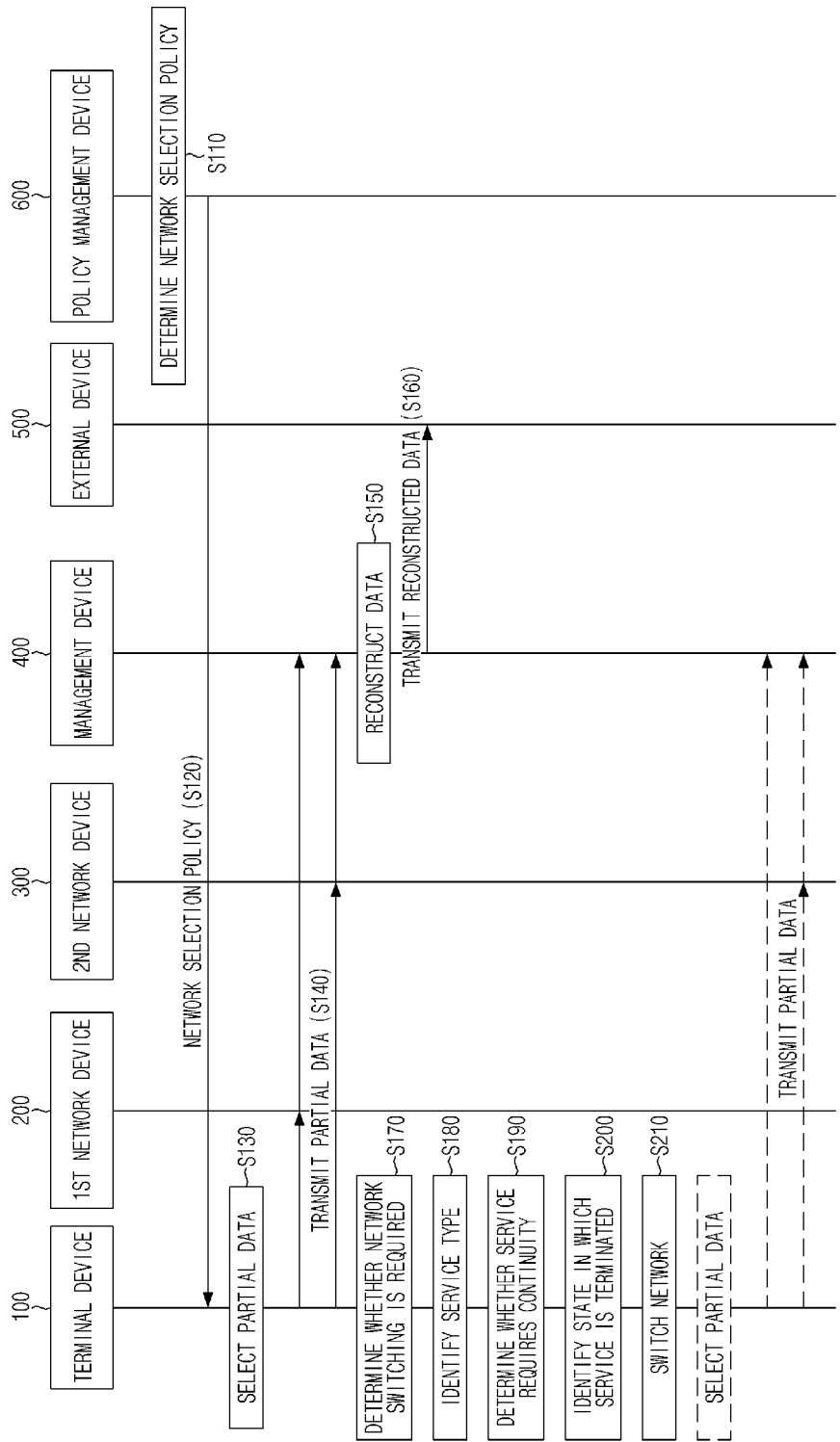
FIG. 3 is a flowchart of an uplink process in an operation method of a heterogeneous network based-simultaneous data transmission service system according to at least one embodiment of the present disclosure.

Meanwhile, when FIG. 3 and FIG. 5 as described above are referred, a situation (a case of offloading to which a network is added) of the uplink process in a heterogeneous network based-simultaneous data transmission service system according to at least one embodiment of the present disclosure will be included.

Hereinafter, an operation method of the terminal device 100 according to at least one embodiment of the present disclosure will be described with reference to FIG. 6.

First, terminal device 100 selects partial data divided from the data to be transmitted based on the network selection policy, in which a data transmission rate for a network received from the policy management device 600 is set, in order to provide the simultaneous data transmission service in steps S310 and S320.

Terminal device 100 divides the data to be transmitted into pieces of data, the number of which corresponds to the number of networks, for the simultaneous data transmission using the heterogeneous network environment, that is, the 3G network and the WiFi network, and the division process may be performed according to the network selection policy transmitted from the policy management device 600.

In other words, terminal device 100 identifies a first transmission rate for data transmission to the first network device 200 and a second transmission rate for data transmission to the second network device 300 included in the network selection policy, selects first partial data to be transmitted to the first network device 200 from divided partial data, and selects second partial data to be transmitted to the second network device 300 from the remaining partial data of the divided partial data based on the identified transmission rates.

Accordingly, by performing the data division process based on the traffic distribution rate of each network corresponding to the network selection policy, terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Then, the communication unit 120, controlled by the controller 110, transmits divided partial data through the first network device 200 and the second network device 300 based on the network selection policy in step S330.

The communication unit 120 transmits the first partial data to the first network device 200 located on the 3G network, and the first network device 200 then transmits the first partial data to the management device 400 functioning as a reception device. Further, the communication unit 120 transmits the second partial data to the particular second network device 300 selected based on information of a network device to be accessed, and the second network device 300 then transmits the second partial data to the management device 400 functioning as a reception device.

Meanwhile, when network switching is required in a process of using a simultaneous service through the first network device 200 and the second network device 300 according to the network selection policy, terminal device 100 determines whether a currently executed service requires continuity by identifying the type of the currently executed service in steps S340 to S370.

Terminal device 100 determines whether the currently executed service requires continuity by identifying the type of a currently executed service according to change in the data transmission rate of each network according to the network selection policy or network switching based on network information collected at a current location, i.e. in response to new recognition of a second network device 300 for operating a WiFi network (i.e. a wireless local area network) through a scan operation, for example, according to change in the data transmission rate between the 3G network and the WiFi network or an added another WiFi network access.

To this end, terminal device 100 stores the service type information designated corresponding to identification information of an application and identifies the identification information of the application corresponding to the currently executed service based on this so that the terminal device 100 identifies a service type corresponding to the currently executed service, and determines whether the currently executed service requires continuity, in accordance with the identified service type.

In other words, terminal device 100 identifies a type of the currently executed service, e.g., VoIP, VOD, Web, FTP, or the like based on the identified identification information of the application and, when the identified service type is a service which requires a download service or a streaming service, determines the corresponding service as a service requiring continuity.

In at least another embodiment, terminal device 100 receives identification information of the particular application from a particular device interworked with a particular application, e.g., the external device 500 and identifies the service type based on the corresponding identification information to thereby determine whether the currently executed service requires continuity.

Then, terminal device 100 performs the network switching by controlling network switching timing as a result of the determination in steps S380 to S400.

When the currently executed service is determined as a service requiring continuity, terminal device 100 causes the currently executed service to be continued through the communication unit 120 by performing the network switching at least in a case in which a termination state of the currently executed service is identified and controlling the network switching timing so that continuity of the currently executed service can be guaranteed by preventing the currently executed service from being forcefully terminated according to the network switching. Meanwhile, when the currently executed service is determined as a service not requiring continuity, it is preferable that terminal device 100 immediately performs the network switching.

As described above, in a system and method for providing a heterogeneous network based-simultaneous data transmission service according to the present disclosure, in simultaneous transmission of divided data in a multi-network environment, when network switching is required, it is determined whether the currently executed service requires the continuity, by identifying the type of the currently executed service. Then, according to a result of the determination, the network switching timing is controlled. As a result, the heterogeneous network based-simultaneous data transmission service system may implement an efficient and highly reliable heterogeneous network based-simultaneous data transmission service and guarantee continuity of the service by efficiently controlling access to the network device corresponding to a service type of the currently executed service.

In a system and method for providing a heterogeneous network based-simultaneous data transmission service according to the present disclosure, during simultaneous transmission of divided data in a multi-network environment, when network switching is required, it is determined whether the currently executed service requires the continuity, by identifying the type of the currently executed service. Then, according to a result of the determination, the network switching timing is controlled.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of storage medium (e.g. a computer-readable storage medium). The storage medium may be connected to a machine such as, for example, a computer/processor (which may be referred to herein, for convenience, as a "processor") such that the processor can read information (e.g., software commands) from and write information to the storage medium. Alternatively, the storage medium may be integral to the processor. The processor and the storage medium may reside in an application specific integrated circuits (ASIC). The ASIC may be included in one or more of the terminal device, the first network device, the second network device, the management device, the external device and/or the policy management device and other hardware elements in the heterogeneous network(s). In the alternative, the processor and the storage medium may serve as components of one or more of the terminal device, the first network device, the second network device, the management device, the external device, the policy management and other hardware elements in the heterogeneous network(s).

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

While the present disclosure has been shown and described with reference to certain embodiments thereof, it will be understood by those skilled in the art that various changes in form and details may be made therein without departing from the subject matter, the spirit and scope of the present disclosure. Specific terms used in this disclosure and drawings are used for illustrative purposes and not to be considered as limitations of the present disclosure.

What is claimed is:

1. A transmission device for providing a simultaneous data transmission service over two or more different networks in a heterogeneous network, the transmission device comprising:
    a processor; and
    a memory storing computer-readable instructions that, when executed by the processor, cause the transmission device to:
    simultaneously transmit two or more partial data divided from data to be transmitted in relation to a particular service over the two or more different networks; and
    when a network switching is required in at least one of the two or more different networks during a process of using simultaneous data transmission over the two or more different networks,
        determine whether the particular service is a service requiring continuity for keeping transmission of the two or more partial data related to the particular service over the two or more different networks, and
        control a network switching timing to perform the network switching based on the determination, in order to simultaneously transmit the two or more partial data over each of the two or more networks,
    wherein when the particular service is determined as a service requiring continuity, performing the network switching after completing transmission of the two or more partial data related to the particular service through each of the two or more different networks, and
    when the particular service is determined as a service not requiring continuity, performing the network switching without waiting for completing transmission of the two or more partial data related to the particular service through each of the two or more different networks, and
    wherein the network switching of the at least one of the two or more different networks is required in at least one of
        a case in which a transmission rate of the partial data over the at least one of the two or more different networks is changed, and
        a case in which another network for transmitting the partial data is added to the heterogeneous network.

2. The transmission device of claim 1, wherein the instructions when executed further cause the transmission device to identify a type of the particular service by using identification information of an application providing the particular service.

3. The transmission device of claim 2, wherein the instructions when executed further cause the transmission device to determine the particular service as a service requiring continuity when the type of the particular service is at least one of a download service and a streaming service.

4. A reception device for receiving a simultaneous data transmission service over two or more different networks in a heterogeneous network, the reception device comprising:
    a processor; and
    a memory storing computer-readable instructions that, when executed by the processor, cause the reception device to:
    simultaneously receive two or more partial data in relation to a particular service over the two or more different networks, wherein the received two or more partial data is generated by a transmission device by dividing data being transmitted in relation to the particular service,
    reconstruct the data in relation to the particular service by combining the two or more partial data received over the two or more different networks,
    wherein the instructions when executed further cause the reception device to simultaneously receive the two or more partial data from the transmission device according to a network switching performed by the transmission device in at least one of the two or more different networks at a network switching timing controlled based on determining whether the particular service is a service requiring continuity for keeping transmission of the two or more partial data related to the particular service over the two or more different networks, when the network switching is required in the at least one of the two or more different networks, and
    wherein when the particular service is determined as a service requiring continuity, the network switching is performed after completing transmission of the two or more partial data related to the particular service through each of the two or more different networks, and
    when the particular service is determined as a service not requiring continuity, the network switching is performed without waiting for completing transmission of the two or more partial data related to the particular service through each of the two or more different networks, and
    wherein the network switching of the at least one of the two or more different networks is required in at least one of
        a case in which a transmission rate of the partial data over the at least one of the two or more different networks is changed, and
        a case in which another network for transmitting the partial data is added to the heterogeneous network.

5. A method of providing a simultaneous data transmission service over two or more different networks in a heterogeneous network, the method comprising:
    transmitting simultaneously, by a transmission device, two or more partial data divided from data to be transmitted in relation to a particular service over the two or more different networks;
    determining, by the transmission device, whether the particular service is a service requiring continuity for keeping transmission of the two or more partial data related to the particular service over the two or more different networks, when a network switching is required in at least one of the two or more different networks during a process of using simultaneous data transmission over the two or more different networks; and controlling, by the transmission device, a network switching timing to perform the network switching in the at least one of the two or more different networks based on the determination, in order to simultaneously transmit the two or more partial data over each of the two or more networks, wherein the controlling of the network switching timing comprising:

when the particular service is determined as a service requiring continuity, performing the network switching after completing transmission of the two or more partial data related to the particular service through each of the two or more different networks, and when the particular service is determined as a service not requiring continuity, performing the network switching without waiting for completing transmission of the two or more partial data related to the particular service through each of the two or more different networks, and wherein the network switching of the at least one of the two or more different networks is required in at least one of a case in which a transmission rate of the partial data over the at least one of the two or more different networks is changed, and a case in which another network for transmitting the partial data is added to the heterogeneous network.

6. The method of claim 5, wherein the determining comprises identifying a type of the particular service by using identification information of an application providing the particular service.

7. The method of claim 6, wherein, when the type of the particular service is at least one of a download service and a streaming service, the transmission device determines the particular service as a service requiring continuity.

8. A method of providing a simultaneous data transmission service over two or more different networks in a heterogeneous network, the method comprising:

transmitting simultaneously, by a transmission device, two or more partial data divided from data to be transmitted in relation to a particular service over the one or more networks;

determining, by the transmission device, whether the particular service is a service requiring continuity for keeping transmission of the two or more partial data related to the particular service over the two or more different networks, when a network switching is required in at least one of the two or more different networks;

controlling, by the transmission device, a network switching timing to perform the network switching in the at least one of the two or more different networks based on the determination;

receiving, by a reception device, the two or more partial data simultaneously transmitted from the transmission device over the two or more different networks; and reconstructing, by the reception device, the data by combining the received two or more partial data, wherein the controlling of the network switching timing comprising;

when the particular service is determined as a service requiring continuity, performing the network switching after completing transmission of the two or more partial data related to the particular service through each of the two or more different networks, and when the particular service is determined as a service not requiring continuity, performing the network switching without waiting for completing transmission of the two or more partial data related to the particular service through each of the two or more different networks; and wherein the network switching of the at least one of the two or more different networks is required in at least one of a case in which a transmission rate of the partial data over the at least one of the two or more different networks is changed, and a case in which another network for transmitting the partial data is added to the heterogeneous network.

* * * * *